(12) United States Patent
Leopold et al.

(10) Patent No.: US 7,543,875 B2
(45) Date of Patent: Jun. 9, 2009

(54) TAILGATE ARRANGEMENT OF A MOTOR VEHICLE

(75) Inventors: Frank Leopold, Taunusstein-Orlen (DE); Lee Tyler, Rüsselsheim (DE); Ralf Wilfert, Büttelborn (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/061,461

(22) Filed: Apr. 2, 2008

(65) Prior Publication Data
US 2008/0238122 A1    Oct. 2, 2008

(30) Foreign Application Priority Data
Apr. 2, 2007    (DE) .................. 10 2007 015 864

(51) Int. Cl.
*B60J 7/00*    (2006.01)

(52) U.S. Cl. .................... 296/56; 296/146.8; 296/26.08
(58) Field of Classification Search .............. 296/26.08, 296/26.09, 26.1, 26.11, 146.8, 56, 76
See application file for complete search history.

(56) References Cited

U.S. PATENT DOCUMENTS 6,971,707 B1 * 12/2005 Mullan ...................... 296/172
7,077,453 B1 *  7/2006 Walker ........................ 296/76

* cited by examiner

*Primary Examiner*—Joseph D Pape
(74) *Attorney, Agent, or Firm*—Ingrassia Fisher & Lorenz, P.C.

(57) ABSTRACT

A tailgate arrangement is provided for a motor vehicle, in particular of a passenger car The tailgate arrangement has a cargo space expansion element that is mounted on the inside of the vehicle on a tailgate, surrounds a cavity, is joined or can be joined in at least a water-tight manner to a cargo space of the motor vehicle to expand it and can be braced between the tailgate and a rear support fitted to the rear of the vehicle.

8 Claims, 3 Drawing Sheets

TAILGATE ARRANGEMENT OF A MOTOR VEHICLE

CROSS-REFERENCE TO RELATED APPLICATION

This application claims priority to German Patent Application No. 102007015864.7, filed Apr. 2, 2007, which is incorporated herein by reference in its entirety.

TECHNICAL FIELD

The field of the present invention is automotive engineering and the invention generally relates to a tailgate arrangement of a motor vehicle, in particular of a passenger car.

BACKGROUND

Modern motor vehicles are often constructed such that they can be adapted in as versatile a manner as possible to the respective requirements of the user of the vehicle, whether it is to be able to transport as many passengers as possible, or to have as much cargo space as possible for transporting loads. For example, so-called "compact vans" are sold for this purpose as passenger cars. These compact vans are large-capacity cars for which the design of the passenger compartment can be particularly widely varied. There is typically provided in compact vans of this type a third row of seats behind a second row of seats in order to be able to transport up to 7 or 8 passengers. The seats of the two rows can be collapsed and folded down so that in this way a relatively large cargo space is available for carrying loads, without it being necessary to laboriously dismantle the seats. For example, a 7-seater large-capacity vehicle of this type is sold by the Applicant under the name of "Zafira".

Although the variability, inherent in compact vans of this type, of the passenger compartment is quite capable of satisfying the usual requirements of the user in respect of transporting passengers and loads, it has been found in practice that when a maximum number of passengers is being transported, more often than not loads, for example pieces of luggage, also have to be transported. However, in compact vans, there is comparatively little space available for transporting loads when the maximum number of passengers is in the vehicle.

In contrast to the foregoing, it is at least one object is to provide additional cargo space for transporting loads, in particular when a passenger compartment is fully occupied. In addition, other objects, desirable features and characteristics of the present invention will become apparent from the subsequent detailed description, summary, abstract, and the appended claims, taken in conjunction with the accompanying drawings and this background.

SUMMARY

The foregoing object and other objects are achieved according to the proposal of the invention by a tailgate or tailgate arrangement having the features of the independent claim. Advantageous embodiments of the invention are provided by the features of the subclaims.

More specifically, the invention provides a tailgate or rather a tailgate arrangement or rear section of a motor vehicle, in particular of a passenger car. The tailgate arrangement or rear section comprises a cargo space expansion element which is fitted on the inside of the vehicle on the tailgate and is configured such that it surrounds a cavity such as an interior compartment. In this arrangement, the cargo space expansion element is joined or can be joined to a cargo space of the motor vehicle for the expansion thereof in a virtually or completely gas-tight and water-tight manner and can be braced between the tailgate (which is open or a section of which is open) and a rear support fitted to the rear of the vehicle. Here and hereafter, the positional information "inside the vehicle" or "outside the vehicle" relates to a closed tailgate or to a closed tailgate section.

The cargo space expansion element is advantageously produced from a flexible water-tight and gas-tight material so that, joined to the tailgate, it may be easily stored in a collapsed state.

In an advantageous embodiment of the tailgate arrangement or rear section, the tailgate comprises a tailgate portion which is hinged separately and independently of the tailgate, to which the cargo space expansion element is attached on the inside of the vehicle. For example, for this purpose the tailgate is divided into an upper tailgate portion and a separately hinged lower tailgate portion. In a particularly advantageous manner, the hinged tailgate portion comprises, on the outside of the vehicle, a tailgate portion lid and, on the inside of the vehicle a tailgate portion paneling, the cargo space expansion element being attached on the inside of the vehicle to the tailgate portion lid. In addition, the tailgate portion paneling is provided with an opening which is joined or can be joined to a connecting opening in the cargo space expansion element for connecting with the cargo space.

In a further advantageous embodiment of the tailgate arrangement or tailgate section according to the invention, the cargo space expansion element is, for example provided on the side remote from the vehicle with a loading opening, which can be sealed in a water-tight and gas-tight manner, for loading the cargo space.

In this tailgate arrangement or tailgate section of the motor vehicle, the rear support is advantageously integrated in a displaceable manner in the rear of the vehicle, such that it can be transferred from a rest position into a use position and vice versa.

The invention furthermore relates to a motor vehicle which is fitted with a tailgate or tailgate arrangement or tailgate section as described above.

BRIEF DESCRIPTION OF THE DRAWINGS

The present invention will hereinafter be described in conjunction with the following drawing figures, wherein like numerals denote like elements.

DETAILED DESCRIPTION

Figure 1:
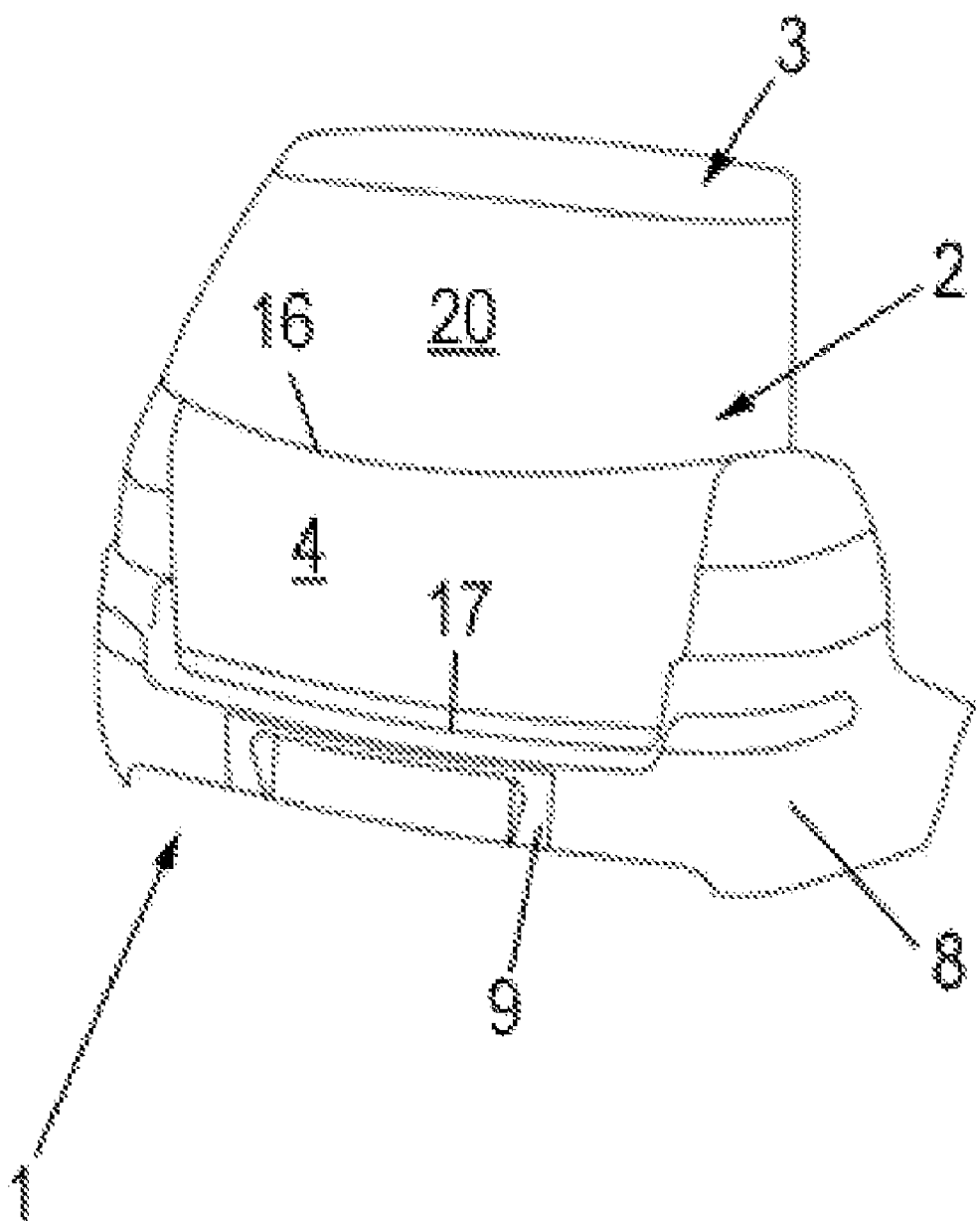
FIG. 1 is a schematic perspective view of the rear section of a passenger car with the tailgate arrangement according to the invention, with the tailgate closed.

The following detailed description of the invention is merely exemplary in nature and is not intended to limit the invention or the application and uses of the invention. Furthermore, there is no intention to be bound by any theory presented in the preceding background of the invention or the following detailed description of the invention.

A tailgate arrangement, denoted overall by reference numeral 1, of a passenger car with a steep rear comprises a tailgate, denoted overall by reference numeral 2, for opening and closing a cargo space opening (luggage compartment opening) of the motor vehicle. The tailgate 2 is composed of two portions, namely an upper tailgate portion 3 with a pane of glass 20 accommodated therein and a lower tailgate portion 4, the upper tailgate portion 3 merging into the lower tailgate portion 4 approximately half-way up the tailgate 2. A parting line 16 extends substantially horizontally between the upper tailgate portion 3 and the lower tailgate portion 4.

The tailgate 2 can be pivoted in a conventional manner about a hinged joint which is positioned approximately at the transition of the tailgate 2 into the roof portion of the motor vehicle or near the upper edge 19 of the upper tailgate portion 3, to thus uncover or close the cargo space opening of the passenger car. FIG. 1 shows the tailgate 2 in a closed state, it being possible for the tailgate 2 to be locked by a locking mechanism (not shown in detail in the Figures) on a portion of bodywork above the rear bumper portion 8 or near the lower edge 17 of the lower tailgate portion 4.

In the region of the lower tailgate portion 4, the tailgate 2 is provided in the inside of the vehicle with a tailgate portion paneling 5. The lower tailgate portion 4 is thus constructed from a tailgate portion paneling 5 positioned on the inside of the vehicle and a tailgate portion lid 7 positioned on the outside of the vehicle, the tailgate portion lid 7 being produced from sheet metal and forming a part of the vehicle bodywork. A substantially rectangular opening 6 is left in the tailgate portion paneling 5 and it opens out into the cargo space or passenger compartment of the vehicle.

Figure 2:
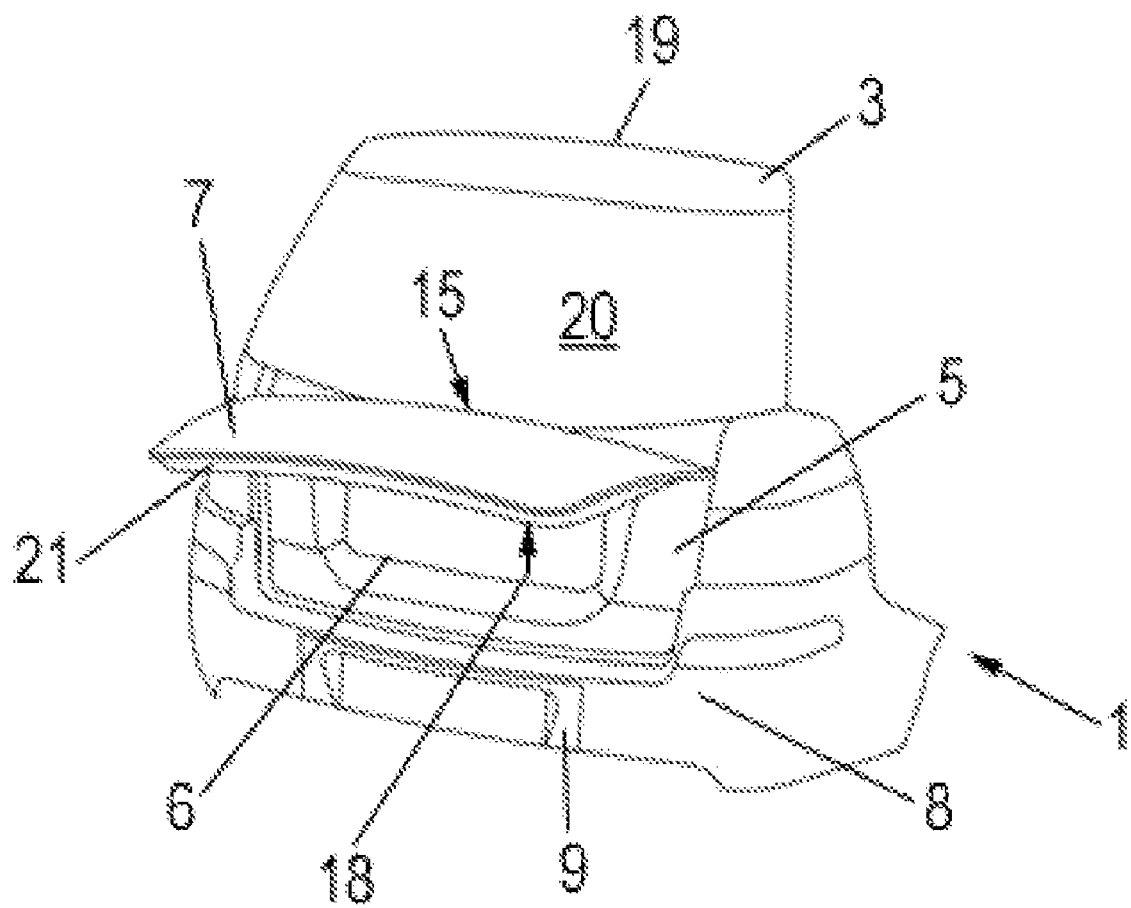
FIG. 2 is a schematic perspective view of the tailgate arrangement of FIG. 1 with an open tailgate portion lid, the cargo space expansion element not having been mounted.
Figure 3:
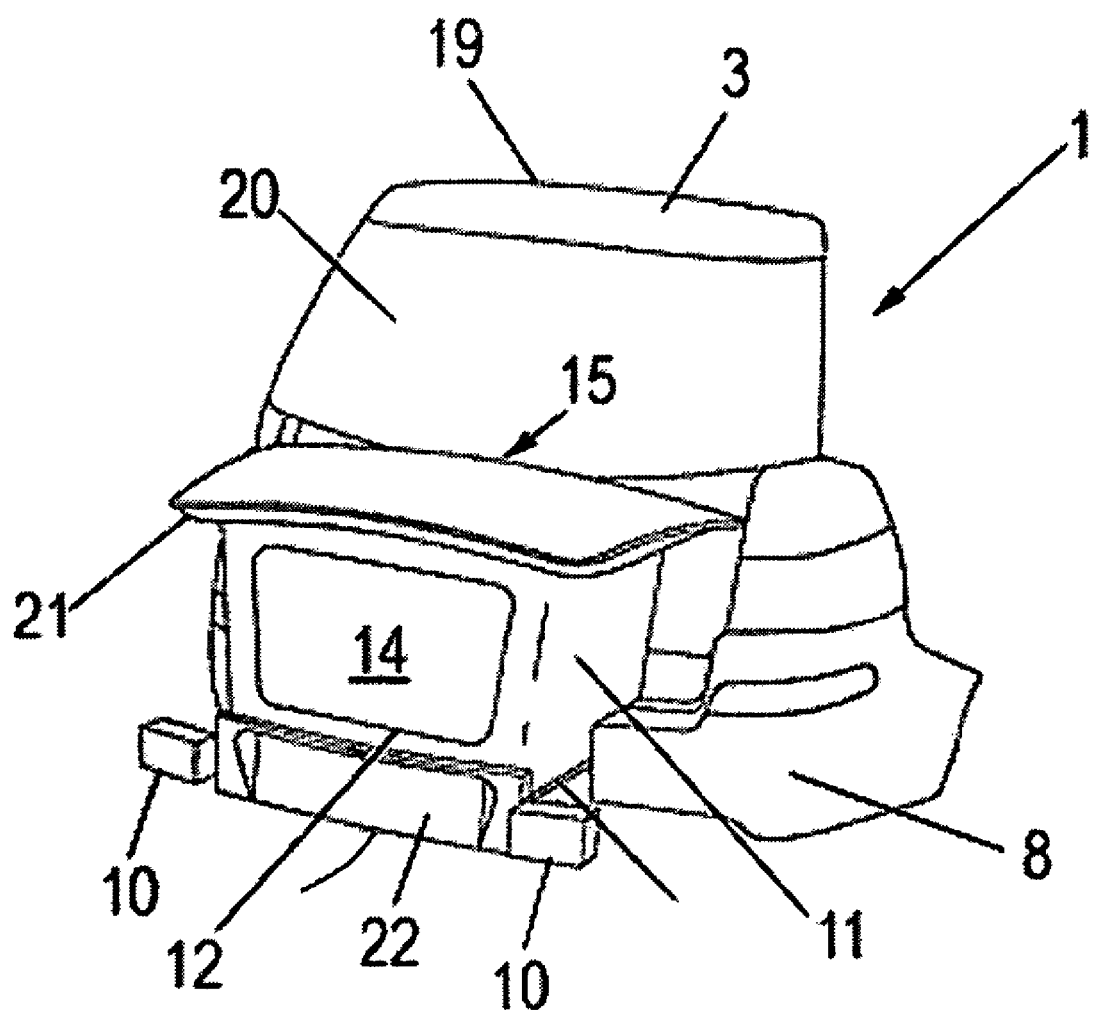
FIG. 3 is a further schematic perspective view of the tailgate arrangement of FIG. 1 with an open tailgate portion lid and a mounted cargo space expansion element.

As shown in FIGS. 2 and 3, the tailgate portion lid 7, produced from sheet metal, can be pivoted with respect to the tailgate portion paneling 5 and the upper tailgate portion 3, for which purpose a hinged joint 15 (not shown in detail in the Figures) is provided between the upper tailgate portion 3 and the lower tailgate portion 4. By means of a holding or locking mechanism (not shown in detail), the tailgate portion lid 7 can, when in an open position, be held or locked in one or more desired positions. As shown in FIGS. 2 and 3, the tailgate portion lid 7 is locked or held, for example in a position in which the tailgate portion lid 7 is oriented approximately parallel to a road on which the motor vehicle is travelling. If the tailgate portion lid 7 is opened, an opening of the cargo space or of the passenger compartment is freed outwards through the opening 6 in the tailgate portion paneling 5. When closed, the tailgate portion lid 7 outwardly closes the luggage compartment or the passenger compartment.

On its lower edge 21, the tailgate portion lid 7 can be locked by a locking mechanism on the bodywork of the vehicle independently of the tailgate 2 and in particular independently of the tailgate portion paneling 5, so that it is possible to transfer the tailgate portion lid 7 into an open or closed position independently of the tailgate 2.

The rear section of the motor vehicle is provided with a rear bumper portion 8 in which a rear support 9 is integrated. By moving in the longitudinal direction of the vehicle, the rear support 9 can be transferred from a rest position into a use position and vice versa. FIGS. 1 and 2 show a situation in which the rear support 9 is in the rest position and is substantially flush with the other portions of the rear bumper portion, whereas FIG. 3 shows a situation in which the rear support 9 has been pulled out into a use position. The displaceable rear support 9 comprises, for example a drawer-like pullout 13 which is secured to the lower side of the vehicle floor by means of a frame. The pullout 13 can be mounted in the frame, for example by means of a telescopic guide system. Furthermore, a recess 22 for receiving a number plate is formed on the rear support 9. Rear lights 10 fitted on the rear support 9 can be folded out at the sides next to the recess 22 of the number plate. A displaceable rear support of this type which is rigidly connected to the vehicle is known per se and is described, for example in European Patent Application EP 1 574 395 by the Applicant; thus no further description is necessary here.

In addition, a cargo space expansion element 11 which is configured in the form of a fabric bag with an opening is secured to the vehicle-inside surface 18. The cargo space expansion element 11 is produced from a flexible, water-tight and gas-tight material and, when the tailgate portion lid 7 is folded down, the cargo space expansion element 11 is in a collapsed state between the tailgate portion lid 7 and the tailgate portion paneling 5. It can be attached in a collapsed form to the tailgate portion lid 7, for example by means of attachment elements configured as tightening straps. When the tailgate portion lid 7 is opened, the cargo space expansion element 11 unfolds, if appropriate after releasing the attachment elements, and can be braced in the manner of a tent between the tailgate portion lid 7 and the rear support 9 which has been moved (drawn out) into its use position. The cargo space expansion element 11 braced between the tailgate portion lid 7 and the rear support 9 then forms a comparatively large cavity which has on the vehicle side an open connecting opening to the opening 6 in the tailgate portion paneling 5. The shape of the vehicle-side connecting opening of the cargo space expansion element 11 approximately matches the opening 6 in the tailgate portion paneling 5 and can be joined to this opening 6 in a virtually or completely water-tight and gas-tight manner, for example by means of a hook-and-loop fastener. Thus, when braced, the cavity of the cargo space expansion element 11 provides a virtually or completely gas-tight and water-tight expansion in volume of the cargo space or of the passenger compartment. The gas-tight and water-tight connection of the cargo space expansion element 11 to the opening 6 in the tailgate paneling can completely or at least as far as possible prevent the penetration of toxic exhaust gases, spray and rain water, as well as ambient air into the cargo space or passenger compartment. The vehicle-side opening in the cargo space expansion element 11 is advantageously permanently connected to the opening 6 in the tailgate portion paneling 5, such that the unfolded cargo space expansion element merely has to be attached to the rear support in order to be mounted.

The cargo space expansion element 11 is furthermore provided with a loading opening which can be closed completely or as far as possible in a gas-tight and water-tight manner by a cover 14 and a closing mechanism 12, for example a zip fastener or a hook-and-loop fastener or the like. The loading opening allows quick access from outside to the cavity of the cargo space expansion element 11 or cargo space of the motor vehicle.

Thus, the cargo space expansion element 11 according to the invention can advantageously provide an expansion of the cargo space or of the passenger compartment of the motor vehicle, so that particularly when a vehicle is full of passengers, an increased cargo space is available to transport loads.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A tailgate arrangement for forming a cargo space in a motor vehicle, comprising:
    a tailgate comprising an upper tailgate portion and a separately hinged lower tailgate portion forming a top portion of the cargo space;
    a cargo space expansion element mounted on an interior of the vehicle on the separately hinged lower tailgate portion, the cargo space expansion element forming lateral sides of the cargo space;
    a displaceable rear support fitted to the rear of the vehicle; and
    a pullout coupled to the cargo space expansion element and the displaceable rear support, the pullout forming a bottom portion of the cargo space.

2. The tailgate arrangement according to claim 1, wherein the separately hinged lower tailgate portion comprises a tailgate portion lid on an exterior of the vehicle and wherein the cargo space expansion element is configured to be fitted to the tailgate portion lid on the interior of the vehicle.

3. The tailgate arrangement according to claim 1, wherein the cargo space expansion element comprises a substantially flexible and water-tight material.

4. The tailgate arrangement according to claim 1, wherein the cargo space expansion element is provided with a loading opening that is configured to close in a substantially water-tight manner.

5. A tailgate arrangement for forming a cargo space in a motor vehicle, comprising:
    a tailgate comprising an upper tailgate portion and a separately hinged lower tailgate portion forming a top portion of the cargo space;
    a cargo space expansion element coupled to the separately hinged lower tailgate portion and forming lateral sides of the cargo space; and
    a retractable pullout coupled to the cargo space expansion element and forming a bottom portion of the cargo space.

6. The tailgate arrangement according to claim 5, wherein the separately hinged lower tailgate portion comprises a first portion forming an exterior portion of the motor vehicle and a second portion forming an interior portion of the motor vehicle, the second portion forming the top portion of the cargo space.

7. The tailgate arrangement according to claim 5, wherein the cargo space expansion element includes an aperture in at least one lateral side for loading cargo into the cargo space.

8. The tailgate arrangement according to claim 5, wherein the retractable pullout is configured to telescopically extend and retract.

* * * * *